United States Patent
Albrecht et al.

(10) Patent No.: US 12,170,681 B2
(45) Date of Patent: Dec. 17, 2024

(54) METHOD AND SYSTEM FOR DETECTING DATA TRAFFIC IN A COMMUNICATION NETWORK

(71) Applicant: Siemens Aktiengesellschaft, Munich (DE)

(72) Inventors: Harald Albrecht, Nuremberg (DE); Stefan Kern, Karlsruhe (DE); Lars Walpurgis, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/802,429

(22) PCT Filed: Jan. 29, 2021

(86) PCT No.: PCT/EP2021/052065
§ 371 (c)(1),
(2) Date: Aug. 25, 2022

(87) PCT Pub. No.: WO2021/170342
PCT Pub. Date: Sep. 2, 2021

(65) Prior Publication Data
US 2023/0085505 A1 Mar. 16, 2023

(30) Foreign Application Priority Data
Feb. 28, 2020 (EP) .................... 20160112

(51) Int. Cl.
*H04L 9/00* (2022.01)
*H04L 9/40* (2022.01)

(52) U.S. Cl.
CPC ...... *H04L 63/1425* (2013.01); *H04L 63/0823* (2013.01); *H04L 63/1416* (2013.01); *H04L 63/20* (2013.01)

(58) Field of Classification Search
USPC ........................................... 726/22
See application file for complete search history.

(56) References Cited

U.S. PATENT DOCUMENTS

| 7,509,490 | B1 * | 3/2009 | Hsu | ...... G06Q 20/383 713/153 |
| 10,805,187 | B2 | 10/2020 | Luuppala et al. | |

(Continued)

FOREIGN PATENT DOCUMENTS

| EP | 3813315 | 4/2021 |
| EP | 3843332 | 6/2021 |

(Continued)

OTHER PUBLICATIONS

PCT International Search Report dated Apr. 19, 2021 based on PCT/EP2021/052065 filed Jan. 29, 2021.

*Primary Examiner* — Christopher J Brown
(74) *Attorney, Agent, or Firm* — Cozen O'Connor

(57) ABSTRACT

Method for detecting data traffic in a communication network, wherein in order to detect data traffic in a communication network, at least one network infrastructure device to which at least one first communication terminal and one second communication terminal are connected provides a monitoring interface that is secured against unauthorized access, is assigned to the two communication terminals, and is intended for detecting data traffic between at least the first and the second communication device, where a device detecting apparatus determines available monitoring interfaces on network infrastructure devices as well as address information assigned to the monitoring interfaces and provides this interface information to at least one recording apparatus that is separate from the at least one network infrastructure device.

15 Claims, 2 Drawing Sheets

(56) References Cited

U.S. PATENT DOCUMENTS

| | | | |
|---|---|---|---|
| 10,904,277 B1* | 1/2021 | Sharifi Mehr | H04L 63/1425 |
| 2005/0246447 A1* | 11/2005 | Smidt | H04L 43/00 |
| | | | 709/229 |
| 2007/0060846 A1* | 3/2007 | Hardin | A61M 25/09 |
| | | | 600/585 |
| 2008/0072307 A1* | 3/2008 | Maes | H04L 67/56 |
| | | | 726/12 |
| 2017/0126745 A1* | 5/2017 | Taylor | H04L 63/0227 |
| 2017/0142132 A1* | 5/2017 | Curcio | H04L 69/22 |
| 2018/0212377 A1* | 7/2018 | Zimmermann | H01R 24/64 |

FOREIGN PATENT DOCUMENTS

| | | |
|---|---|---|
| JP | 2016174420 | 9/2016 |
| WO | 2017203105 | 11/2017 |

* cited by examiner

METHOD AND SYSTEM FOR DETECTING DATA TRAFFIC IN A COMMUNICATION NETWORK

CROSS-REFERENCE TO RELATED APPLICATIONS

This is a U.S. national stage of application No. PCT/EP2021/052065 filed 29 Jan. 2021. Priority is claimed on European Application No. 20160112.7 filed 28 Feb. 2020, the content of which is incorporated herein by reference in its entirety.

BACKGROUND OF THE INVENTION

1. Field of the Invention

The present invention relates to a system and method for detecting data traffic in a communication network, in particular in a communication network of an industrial automation system.

2. Description of the Related Art

Industrial automation systems normally comprise a multiplicity of automation devices networked to one another via an industrial communication network and are used for controlling or regulating installations, machines or devices within the context of production or process automation. Time-critical constraints in industrial automation systems mean that predominantly realtime communication protocols, such as PROFINET, PROFIBUS, realtime Ethernet or time-sensitive networking (TSN), are used for communication between automation devices. In particular, control services or applications may be distributed among currently available servers or virtual machines of an industrial automation system in an automated manner and depending on capacity utilization.

Use for often extremely different applications can create problems in Ethernet-based communication networks, for example, if network resources are used for transferring data streams or data frames with realtime demands in competition with transferring data frames having a large payload content without specific quality of service demands. This can lead to data streams or data frames with realtime demands not being transferred in accordance with a demanded or required quality of service. For this particular reason, suitable means for monitoring data traffic are of great importance.

European patent application 19204976.5 discloses a method for diagnosing the data traffic in a cluster containing multiple worker nodes that involves using the worker nodes to provide containers or pods. A cluster detection module is used to acquire information regarding which worker nodes a node detection module is associated with. If the cluster detection module receives a request to acquire data packets, then the cluster detection module contacts the node detection modules of the relevant nodes, and the node detection modules acquire data packets. Additionally, the node detection modules forward the acquired data packets, or the duplicates thereof, to the cluster detection module. The cluster detection module in turn forwards the acquired data packets, or duplicates, to a particular requesting unit.

International patent application PCT/EP2019/082894 relates to a method for acquiring data packets that originate from a first container within a cluster of containers. Here, each container has multiple associated network interfaces for transferring data packets. As soon as a first connection for transferring data packets via a first network interface associated with the first container is detected, an identifier associated with the first container is inserted into a data stream associated with the first connection. The inserted identifier may be taken as a basis for identifying the first container in order to acquire data packets that originate therefrom.

European patent application 19219277.1 describes a method for monitoring data traffic in a communication network that is used to provide control applications via flow control components. To use the control applications, first access rights are checked. An access control apparatus enables access to communication network interfaces used by the flow control components and, for this purpose, checks second access rights to use the communication network interfaces. A request from a user to monitor data traffic that emanates from or terminates at a selected control application prompts the access control apparatus to query a monitoring apparatus for first access rights for the user to use the selected control application. Based on the first access rights requested from the monitoring apparatus, the access control apparatus grants second access rights to use the communication network interfaces associated with the selected control application for the requested monitoring of the data traffic.

JP 2016 174420 A discloses a method for monitoring data traffic in a multiplicity of communication networks that involves receiving traffic data from monitored devices and storing traffic accumulation data. The traffic data are extracted from the traffic accumulation data via an analysis unit for each monitored communication network. The analysis unit uses the extracted traffic data to generate traffic analysis data, which are stored in combination with an identifier of the respective monitored communication network. The traffic analysis data are provided upon user request by indicating the identifier of the respective communication network.

Functions for detecting or monitoring data traffic in a communication network may fundamentally also be provided within an industrial automation system or a private communication system and, thus, in a user-oriented manner via an edge computing solution. If, for example, only occasional use of such functions means that the user does not require dedicated hardware and software to be provided and maintained for such purposes, then there is the possibility of using cloud computing solutions. In addition, in many cases, it is not economical to incorporate network monitoring functions into existing network infrastructure devices, such as switches or routers, via an edge computing solution. This is because applicable analysis functions often have a high resource requirement compared to the performance of the network infrastructure devices.

SUMMARY OF THE INVENTION

In view of the foregoing, it is therefore an object of the present invention to provide a method for reliably detecting data traffic in a communication network that can be incorporated into existing communication systems with little effort and to provide a suitable arrangement for implementing the method.

This and other objects and advantages are achieved in accordance with the invention by a system and method which is intended to detect data traffic in a communication network comprising at least a first and a second communication terminal and at least one network infrastructure device, to which the two communication devices are connected. The two communication terminals may be in particular industrial automation devices, such as programmable logic controllers, local peripheral devices or input/output units, having a communication module, while the network infrastructure device is a switch or router, for example. The network infrastructure device is used to provide a monitoring interface for detecting data traffic between at least the first and second communication devices, where monitoring interface are associated with the two communication terminals and protected against unauthorized access.

In accordance with the invention, a device detection apparatus is used to ascertain interface information, which includes available monitoring interfaces on network infrastructure devices and address information associated with the monitoring interfaces, and to provide this interface information to at least one logging apparatus that is separate from the at least one network infrastructure device. The address information includes IP addresses or service access information, for example, in particular details about a port associated with a logging service. The logging apparatus is preferably used to configure logging functions on the monitoring interface associated with the two communication terminals.

A request from a user to detect the data traffic between the first and second communication terminals prompts the logging apparatus, in accordance with the invention, to take the interface information provided via the device detection apparatus as a basis for accessing the monitoring interface associated with the two communication terminals and at least temporarily storing data traffic detected there. Users may be persons, physical or logical control devices, for example. The present invention allows existing network infrastructure devices to be extended, depending on communication-related or organizational constraints, by functions for detecting or analyzing data traffic without this requiring fundamental changes to the network infrastructure devices.

An access control apparatus is preferably used to manage address information and access rights to use monitoring interfaces on network infrastructure devices. In this case, the logging apparatus responds to the request from the user to detect the data traffic between the first and second communication terminals by querying the access control apparatus for access rights for the user to use the monitoring interface associated with the two communication terminals. Accordingly, the logging apparatus takes the interface information provided via the device detection apparatus and the access rights requested from the access control apparatus as a basis for accessing the monitoring interface associated with the two communication terminals. The access rights are granted by providing passwords, digital certificates or digital keys, for example. Besides the access rights, the access control apparatus can also manage IP addresses of network infrastructure devices. In addition, the access control apparatus may be embodied multiply for reasons of redundancy or load distribution.

In accordance with a preferred embodiment of the invention, the data traffic between the first and second communication terminals is detected to analyze the data traffic via the logging apparatus or via an evaluation apparatus that is separate from the at least one logging apparatus. If the detected data traffic between the first and second communication terminals is analyzed via the evaluation apparatus, then the logging apparatus provides the detected data traffic to the evaluation apparatus. In particular, the logging apparatus may encapsulate or conceal from the evaluation apparatus detail information concerning specifically how logging functions need to be called for network infrastructure devices.

In addition, in accordance with a further embodiment, the detected data traffic is provided via an encrypted connection between the logging apparatus and the evaluation apparatus. By contrast, the logging apparatus is preferably connected to the network infrastructure device providing the monitoring interface associated with the two communication terminals via a data link layer transmission link, in particular a direct data link layer transmission link. Moreover, functions for analyzing data traffic are advantageously provided as a monitoring service via the evaluation apparatus. Here, requests from users to analyze data traffic are sent to the evaluation apparatus as a service access point.

The system in accordance with the invention is intended to detect data traffic in a communication network comprising at least one network infrastructure device, to which at least a first and a second communication terminal are connected. In particular, the system in accordance with the invention is suitable for implementing the method in accordance with the disclosed embodiments. The system comprises a monitoring interface for detecting data traffic between at least the first and second communication devices, where the monitoring interface is associated with the two communication terminals and protected against unauthorized access, a device detection apparatus and at least one logging apparatus that is separate from the at least one network infrastructure device.

In this case, the device detection apparatus is arranged and configured, in accordance with the invention, to ascertain interface information, which includes available monitoring interfaces on network infrastructure devices and address information associated with the monitoring interfaces, and to provide this interface information to the logging apparatus. The logging apparatus is arranged and configured to respond to a request from a user to detect the data traffic between the first and second communication terminals by taking the interface information provided by way of the device detection apparatus as a basis for accessing the monitoring interface associated with the two communication terminals and at least temporarily storing data traffic detected by the monitoring interface.

The system for detecting data traffic preferably comprises an access control apparatus, which is arranged and configured to manage address information and access rights to use monitoring interfaces on network infrastructure devices. Here, the logging apparatus is arranged and configured to respond to the request from the user to detect the data traffic between the first and second communication terminals by querying the access control apparatus for access rights for the user to use the monitoring interface associated with the two communication terminals. Accordingly, the logging apparatus is advantageously arranged and configured to take the interface information provided via the device detection apparatus and the access rights requested from the access control apparatus as a basis for accessing the monitoring interface associated with the two communication terminals.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained more thoroughly below using an exemplary embodiment with reference to the drawing, in which.

DETAILED DESCRIPTION OF THE EXEMPLARY EMBODIMENTS

Figure 1:
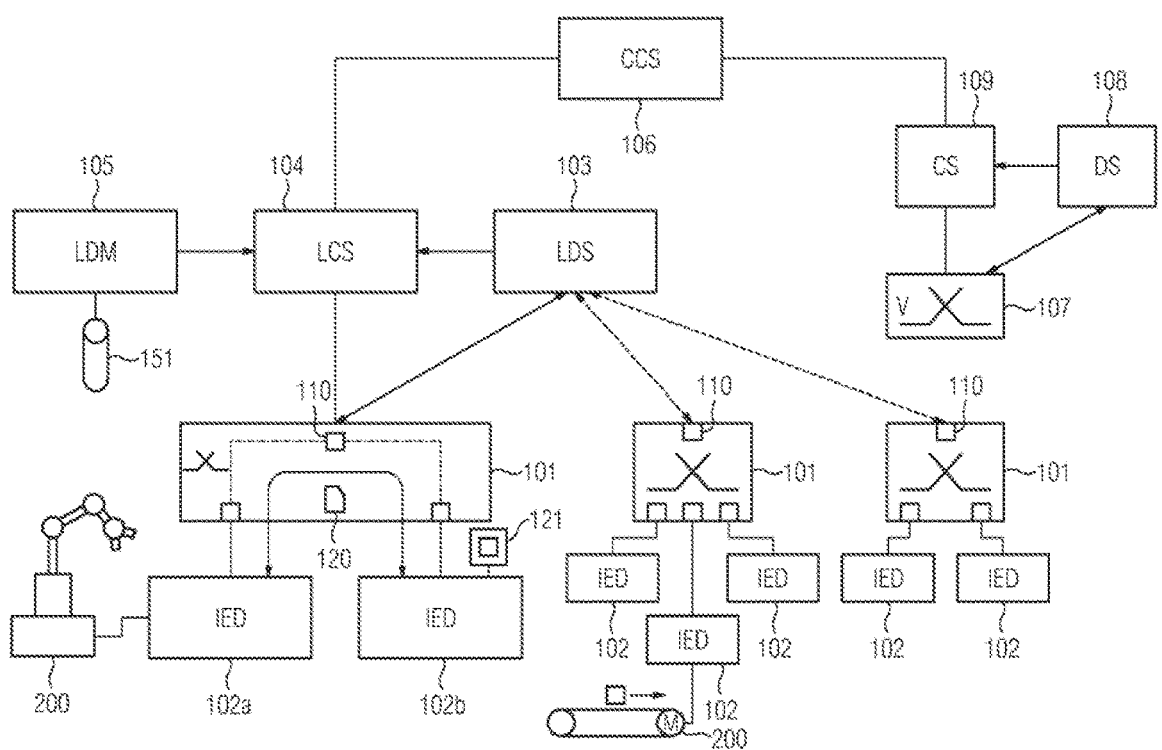
FIG. 1 is a schematic illustration of an arrangement containing multiple network infrastructure devices and communication terminals and also a system for detecting data traffic in a communication network in accordance with the invention.

The arrangement shown in the FIG. 1 comprises multiple network infrastructure devices 101 and multiple communication terminals 102, 102a-b, each of which is connected to a network infrastructure device 101. The network infrastructure devices 101 in the present exemplary embodiment are switches. In principle, routers may also be network infrastructure devices 101. Communication terminals 102 particularly include programmable logic controllers, local peripheral devices, input/output units and operating and observation stations of an industrial automation system, each of which comprises a communication module.

Programmable logic controllers typically each comprise a central processing unit and at least one input/output unit, in addition to a communication module. Input/output units may, in principle, also be configured as local peripheral modules arranged remotely from a programmable logic controller. The communication module can connect a programmable logic controller to a switch or router or additionally to a field bus. The input/output unit is used for interchanging control variables and measured variables between the programmable logic controller and a machine or apparatus 200 controlled by the programmable logic controller. The central processing unit is intended in particular for ascertaining suitable control variables from acquired measured variables. The above components of the programmable logic controller are preferably connected to one another via or over a backplane bus system.

An operating and observation station is used to visualize process data or measured and control variables that are processed or acquired via programmable logic controllers, input/output units or sensors. In particular, an operating and observation station is used to display values of a control loop and to alter control parameters. Operating and observation stations comprise at least one graphical user interface 121, an input device and a processor unit, in addition to a communication module.

To detect data traffic 120 between a first communication terminal 102a and a second communication terminal 102b, at least one network infrastructure device 101, to which at least the first 102a and second 102b communication terminals are connected, provides a monitoring interface 110 that is associated with the two communication terminals 102a-b and protected against unauthorized access. In the present exemplary embodiment, there is provision for multiple network infrastructure devices 101, each of which makes a monitoring interface 110 available.

Available monitoring interfaces 110 on network infrastructure devices 101 are ascertained via a device detection apparatus 103 that provides a legacy device discovery service. Moreover, the device detection apparatus 103 ascertains address information associated with the monitoring interfaces 110 and provides information about the ascertained monitoring interfaces 110, including the associated address information, to a logging apparatus 104, which is separate from the aforementioned network infrastructure device 101, as interface information. The address information is service access information and includes, for example, IP addresses and details about a port associated with a logging service, in particular a legacy device capture service provided by way of the logging apparatus 104. In addition, the logging apparatus 104 configures logging functions on the monitoring interface 110 associated with the two communication terminals 102a-b.

As shown in the FIG. 1, there is moreover provision in the present exemplary embodiment for an access control apparatus 105 that is used to implement a legacy device management service. The access control apparatus 105 is used to manage address information and access rights to use monitoring interfaces 110 on network infrastructure devices 101. To this end, the access control apparatus 105 has an associated database 151 that stores, or is used to store, applicable access information. In principle, such access information may be adopted from an engineering system of an industrial automation system. The access rights may be granted by providing passwords, digital certificates or digital keys, for example.

A request from a user to detect the data traffic 120 between the first 102a and second 102b communication terminals prompts the logging apparatus 105 to query the access control apparatus 105 for access rights for the user to use the monitoring interface 110 associated with the two communication terminals 102a-b. In this context, the term user includes in particular persons and physical or logical control devices. Based on interface information provided by way of the device detection apparatus 103 and the access rights requested from the access control apparatus 105, the logging apparatus 104 accesses the monitoring interface 110 associated with the two communication terminals 102a-b and at least temporarily stores data traffic 120 detected there. The data traffic 110 between the first and second communication terminals 102a-b is detected in particular to analyze the data traffic 120 via the logging apparatus 104 or via a separate, superordinate evaluation apparatus 106. In the latter case, the logging apparatus 104 provides the detected data traffic just to the superordinate evaluation apparatus 106, which is then used to analyze the detected data traffic.

The logging apparatus 104 preferably conceals detail knowledge concerning how recording functions need to be addressed for a network infrastructure device 101. In particular, recording functions may be switched on only temporarily for certain network infrastructure devices when a recording is being made.

A superordinate evaluation apparatus 106 may be used to provide a cluster capture service, for example, which also includes monitoring functions for data traffic in virtualized communication networks 107. For this data traffic too, analogously to the explanations above, there is provision for a detection apparatus 108 for virtualized network infrastructure devices that provides a virtual network discovery service, and for a corresponding logging apparatus 109 for providing a virtual network capture service. It is thus also possible to ascertain and analyze virtual communication device interconnections on Docker hosts and Kubernetes nodes.

In accordance with a preferred embodiment, the logging apparatus 104 initially connects to a management interface of the respective network infrastructure device 101, and then configures the recording functions of the management interface as active and subsequently connects to a selected TCP port of the network infrastructure device 101. This selected TCP port and a websocket stream that has been set up as appropriate are used to transmit a recording to the logging apparatus 104. When the recording has ended and the websocket stream has been cleared, the logging apparatus 104 terminates its connection to the network infrastructure device 101 with respect to the monitoring interface. Finally, the logging apparatus 104 configures the recording functions of the network infrastructure device 101 as inactive and terminates its connection to the management interface of the network infrastructure device 101.

By way of example, communication between the logging apparatus 104 and the superordinate evaluation apparatus 106 may be effected using a secure websocket data stream that is encrypted and protected by means of mTLS. This may be implemented in particular using service meshes, such as Istio (https://istio.io). In the present exemplary embodiment, a device-specific transport connection that is set up in accordance with TCP or TLS is used between the logging apparatus 104 and the respective network infrastructure device 101. If the logging apparatus 104 is placed in direct topological proximity to the respective network infrastructure device 101, in particular with as direct a Layer 2 connection as possible, it is possible to minimize a vulnerability of a short, only weakly protected transport connection in combination with a cellular protection concept.

Figure 2:
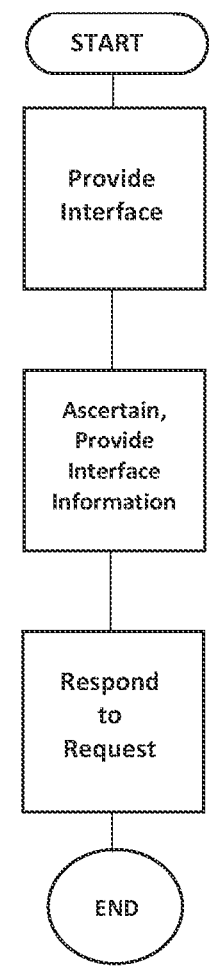
FIG. 2 is a flowchart of the method in accordance with the invention.

FIG. 2 is a flowchart of the method for detecting data traffic in a communication network. The method comprises providing, via at least one network infrastructure device 101, a monitoring interface 110 for detecting data traffic 120 between at least the first and second communication devices, as indicated in step 210. In accordance with the method of the invention, at least a first 102a and a second 102b communication terminal are connected to the least one network infrastructure device 101, and the monitoring interface is associated with the first and second communication terminals 102a, 102b and is protected against unauthorized access.

Next, interface information which includes available monitoring interfaces 110 on network infrastructure devices and address information associated with the monitoring interfaces is ascertained via a device detection apparatus 103, and the interface information is provided to at least one logging apparatus 104 that is separate from the at least one network infrastructure device 101, as indicated in step 220.

Next, the logging apparatus 104 responds to a request from a user to detect the data traffic between the first and second communication terminals by taking the interface information provided via the device detection apparatus 103 as a basis for accessing the monitoring interface 110 associated with the first and second communication terminals and at least temporarily storing data traffic detected at the monitoring interface 110, as indicated in step 230.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for detecting data traffic in a communication network comprising at least one network infrastructure device, to which at least a first and a second communication terminal are connected, the method comprising:
  providing, via the at least one network infrastructure device, a monitoring interface arranged in at the at least one network infrastructure device, said monitoring interface detecting data traffic between at least the first and second communication devices, at least the first and the second communication terminal being connected to the least one network infrastructure device, and the monitoring interface being associated with the first and second communication terminals and being protected against unauthorized access;
  ascertaining, via a device detection apparatus, interface information which includes available monitoring interfaces on network infrastructure devices and address information associated with the monitoring interfaces, and providing said interface information to at least one logging apparatus which is physically separate from the at least one network infrastructure device, a respective monitoring interface of the first network infrastructure device of the plurality of network infrastructure devices being directly, operatively connected to the at least one logging apparatus; and
  responding, by the logging apparatus, to a request from a user to detect the data traffic between the first and second communication terminals by taking the interface information provided via the device detection apparatus as a basis for accessing the monitoring interface associated with the first and second communication terminals and at least temporarily storing data traffic detected at the monitoring interface;
  wherein an evaluation apparatus which is physically separate from and directly, operatively coupled to the at least one logging apparatus provides a cluster capture service which includes monitoring functions for data traffic and virtualized communication networks.

2. The method as claimed in claim 1, wherein an access control apparatus is utilized to manage address information and access rights to use monitoring interfaces on network infrastructure devices;
  wherein the logging apparatus responds to the request from the user to detect the data traffic between the first and second communication terminals by querying the access control apparatus for access rights for the user to use the monitoring interface associated with the two communication terminals; and
  wherein the logging apparatus takes the interface information provided via the device detection apparatus and the access rights requested from the access control apparatus as a basis for accessing the monitoring interface associated with the first and second communication terminals.

3. The method as claimed in claim 2, wherein the access rights are granted by providing at least one of passwords, digital certificates and digital keys.

4. The method as claimed in claim 1, wherein the address information includes at least one of IP addresses and service access information comprising details about a port associated with a logging service.

5. The method as claimed in claim 2, wherein the address information includes at least one of IP addresses and service access information comprising details about a port associated with a logging service.

6. The method as claimed in claim 3, wherein the address information includes at least one of IP addresses and service access information comprising details about a port associated with a logging service.

7. The method as claimed in claim 1, wherein the logging apparatus is utilized to configure logging functions on the monitoring interface associated with the first and second communication terminals.

8. The method as claimed in claim 1, wherein the data traffic between the first and second communication terminals is detected to analyze the data traffic via the logging apparatus or via the evaluation apparatus which is physically separate from and directly, operatively coupled to the at least one logging apparatus.

9. The method as claimed in claim 8, wherein the detected data traffic between the first and second communication terminals is analyzed via the evaluation apparatus; and wherein the logging apparatus provides the detected data traffic to the evaluation apparatus.

10. The method as claimed in claim 9, wherein the detected data traffic is provided via an encrypted connection between the logging apparatus and the evaluation apparatus.

11. The method as claimed in claim 9, wherein functions for analyzing data traffic are provided as a monitoring service via the evaluation apparatus; and wherein requests from users to analyze data traffic are sent to the evaluation apparatus as a service access point.

12. The method as claimed in claim 1, wherein the logging apparatus is connected to the network infrastructure device providing the monitoring interface associated with the two communication terminals via a data link layer transmission link.

13. The method as claimed in claim 1, wherein users include at least one of persons, physical control devices and logical control devices.

14. A system for detecting data traffic in a communication network comprising at least one network infrastructure device, to which at least a first and a second communication terminal are connected, the system comprising:

a monitoring interface arranged in the at least one network infrastructure device, said monitoring interface detecting data traffic between at least the first and second communication devices, said monitoring interface being associated with the first and second communication terminals and being protected against unauthorized access;

a device detection apparatus;

at least one logging apparatus which is physically separate from the at least one network infrastructure device, the monitoring interface of the at least one network infrastructure device being directly, operatively coupled to the at least one logging apparatus; and an evaluation apparatus which is physically separate from and directly, operatively coupled to the at least one logging apparatus, the evaluation apparatus providing a cluster capture service which includes monitoring functions for data traffic and virtualized communication networks;

wherein the device detection apparatus is configured to ascertain interface information which includes available monitoring interfaces on network infrastructure devices and address information associated with the monitoring interfaces, and configured to provide said interface information to the logging apparatus; and wherein the logging apparatus is configured to respond to a request from a user to detect the data traffic between the first and second communication terminals by taking the interface information provided via the device detection apparatus as a basis for accessing the monitoring interface associated with the first and second communication terminals and at least temporarily storing data traffic detected at the monitoring interface.

15. The system as claimed in claim 14, further comprising:

an access control apparatus which is configured to manage address information and access rights to use monitoring interfaces on network infrastructure devices;

wherein the logging apparatus is further configured to respond to the request from the user to detect the data traffic between the first and second communication terminals by querying the access control apparatus for access rights for the user to utilize the monitoring interface associated with the two communication terminals; and wherein the logging apparatus is further configured to take the interface information provided via the device detection apparatus and the access rights requested from the access control apparatus as a basis for accessing the monitoring interface associated with the first and second communication terminals.

* * * * *